US008226152B2

(12) United States Patent
Calco

(10) Patent No.: US 8,226,152 B2
(45) Date of Patent: Jul. 24, 2012

(54) RETRACTABLE WIND DEFLECTOR FOR VEHICLE WINDOW

(76) Inventor: Wayne A. Calco, Laguna Hills, CA (US)

( * ) Notice: Subject to any disclaimer, the term of this patent is extended or adjusted under 35 U.S.C. 154(b) by 492 days.

(21) Appl. No.: 12/264,833

(22) Filed: Nov. 4, 2008

(65) Prior Publication Data
US 2010/0109377 A1    May 6, 2010

(51) Int. Cl.
*B60J 1/20* (2006.01)
(52) U.S. Cl. ..................... 296/180.1; 296/152
(58) Field of Classification Search ............... 296/180.5, 296/180.1, 146.16, 152; 49/502
See application file for complete search history.

(56) References Cited

U.S. PATENT DOCUMENTS

| 1,919,749 A * | 7/1933 | Robinson ............... 454/135 |
|---|---|---|
| 2,465,345 A | 3/1949 | Elsebusch |
| 2,739,834 A | 2/1950 | Bryce |
| 2,608,926 A | 9/1952 | Helsley |
| 2,685,470 A | 9/1952 | Werner |
| 2,658,793 A | 11/1953 | Sinclair |
| 2,786,711 A | 3/1957 | Culver |
| 2,841,440 A | 7/1958 | Werner |
| 2,878,055 A | 3/1959 | Werner et al. |
| 4,085,665 A | 4/1978 | Paxton |
| 4,423,668 A | 1/1984 | Long |
| 4,476,774 A | 10/1984 | Liberto et al. |
| 4,700,980 A | 10/1987 | Josefczak |
| 5,114,205 A | 5/1992 | Jee |
| 5,150,941 A | 9/1992 | Silzer et al. |
| 5,251,953 A | 10/1993 | Willey |
| 5,702,149 A | 12/1997 | Sweeney |
| 7,367,609 B2 * | 5/2008 | Grudzinski et al. ....... 296/180.1 |

FOREIGN PATENT DOCUMENTS

| DE | 24 56 653 A1 | 8/1976 |
|---|---|---|
| DE | 10 2005 0207079 B3 | 12/2006 |
| DE | 10 2005 058045 B3 | 9/2007 |

OTHER PUBLICATIONS

International Search Report; Written Opinion of the International Searching Authority; PCT/US2009/063090 mailed Apr. 2, 2010.

* cited by examiner

*Primary Examiner* — Glenn Dayoan
*Assistant Examiner* — Melissa Black
(74) *Attorney, Agent, or Firm* — Larry K. Roberts

(57) ABSTRACT

A retractable wind deflector for a vehicle is configured to deploy a deflector body from a stowed position to a deployed position extending outside the vehicle compartment when a window is opened, and to return the deflector body from the deployed position to the stowed position when the window is closed.

24 Claims, 8 Drawing Sheets

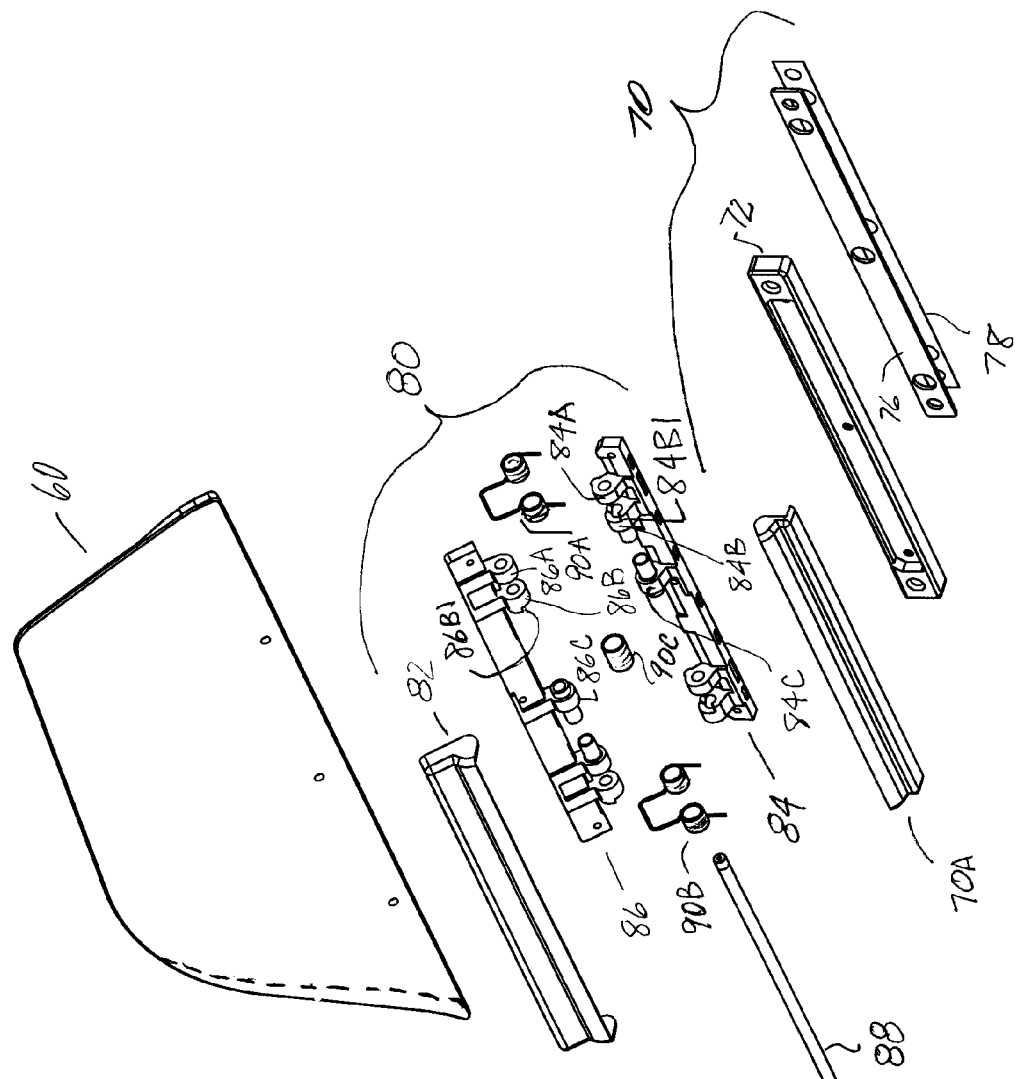

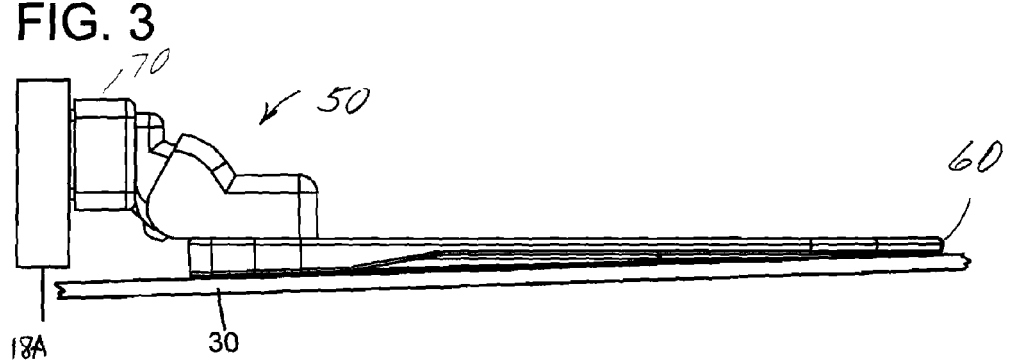
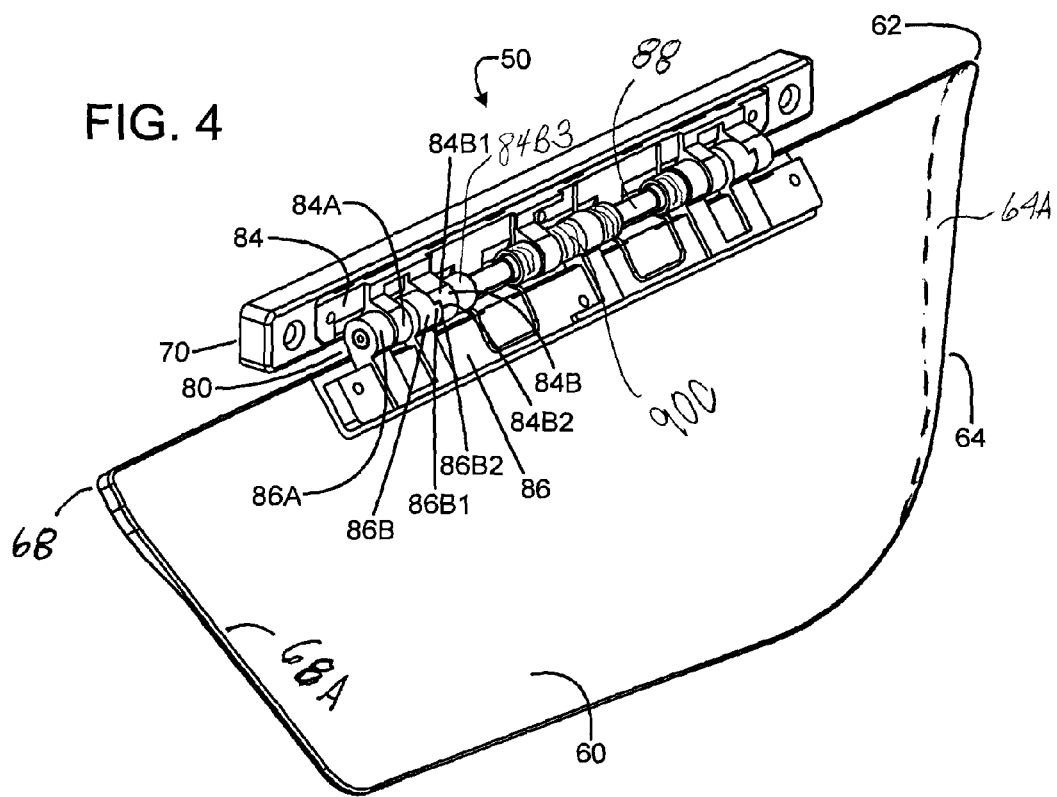

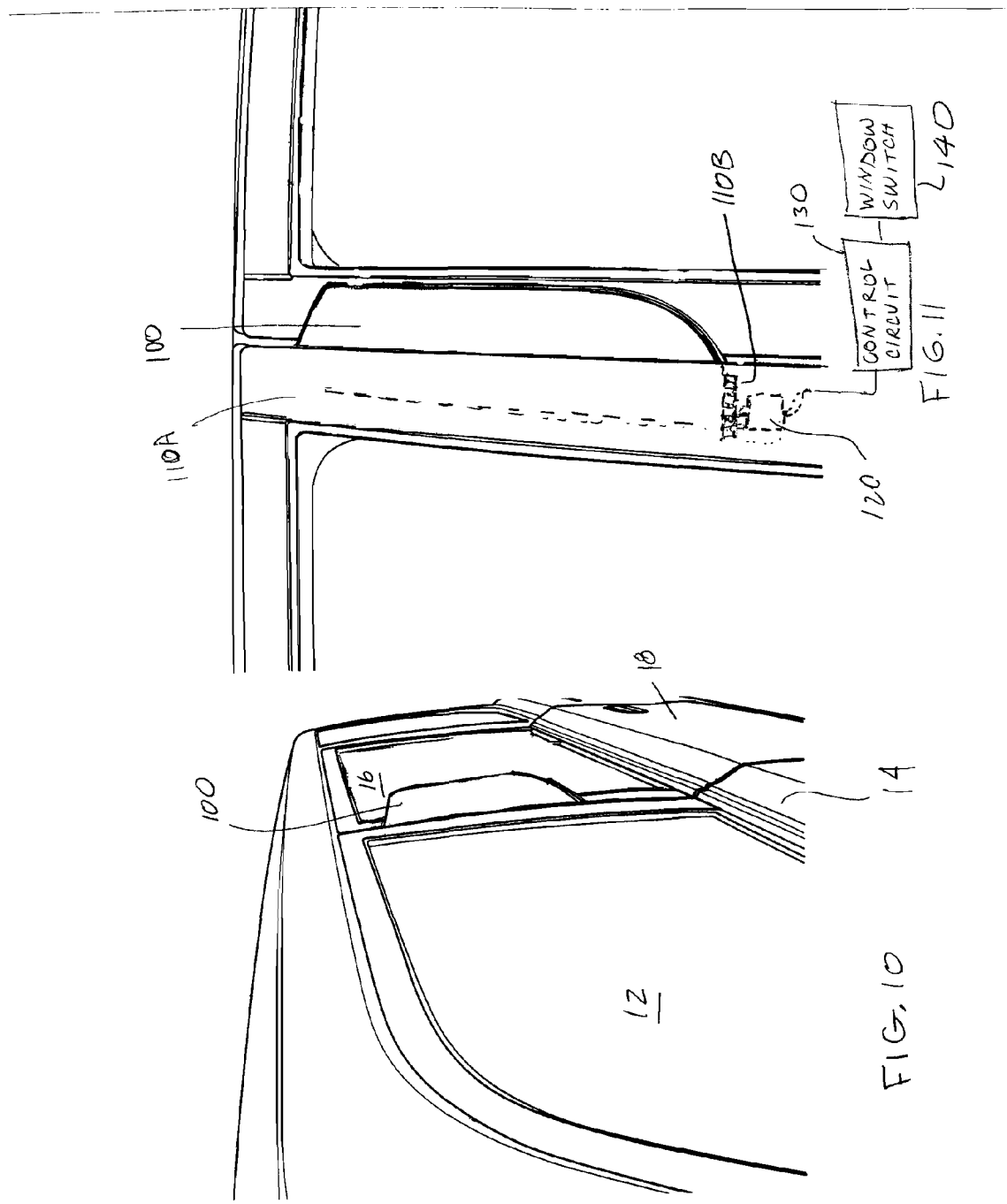

RETRACTABLE WIND DEFLECTOR FOR VEHICLE WINDOW

BACKGROUND

Wind noise caused by open windows in a vehicle at speed can be aggravating to passengers in the vehicle. This is particularly so for vehicles with rear seats and doors with roll-up/down windows. For example, with one open window in a rear door, there can be substantial noise which is objectionable to one riding in the rear seat of the vehicle. The noise may result from high/low air pressure buffeting that can be felt physically as well as heard. A front window may be opened to eliminate the uncomfortable buffeting, but this may not be desirable for the vehicle driver/front passenger.

BRIEF DESCRIPTION OF THE DRAWINGS

Features and advantages of the disclosure will readily be appreciated by persons skilled in the art from the following detailed description when read in conjunction with the drawing wherein:

FIG. 1A is an exploded isometric view of an exemplary embodiment of a retractable wind deflector system as in FIG. 1.

FIG. 3 is a top view of the wind deflector system of FIG. 1.

FIG. 4 is an isometric view of the wind deflector system of FIG. 1, but shown in a deployed position.

FIG. 10 is a side isometric view of a portion of a vehicle showing an alternate embodiment of the wind deflector.

FIG. 11 is a diagrammatic partial side view, illustrating the wind deflector of FIG. 10.

DETAILED DESCRIPTION

Figure 1:
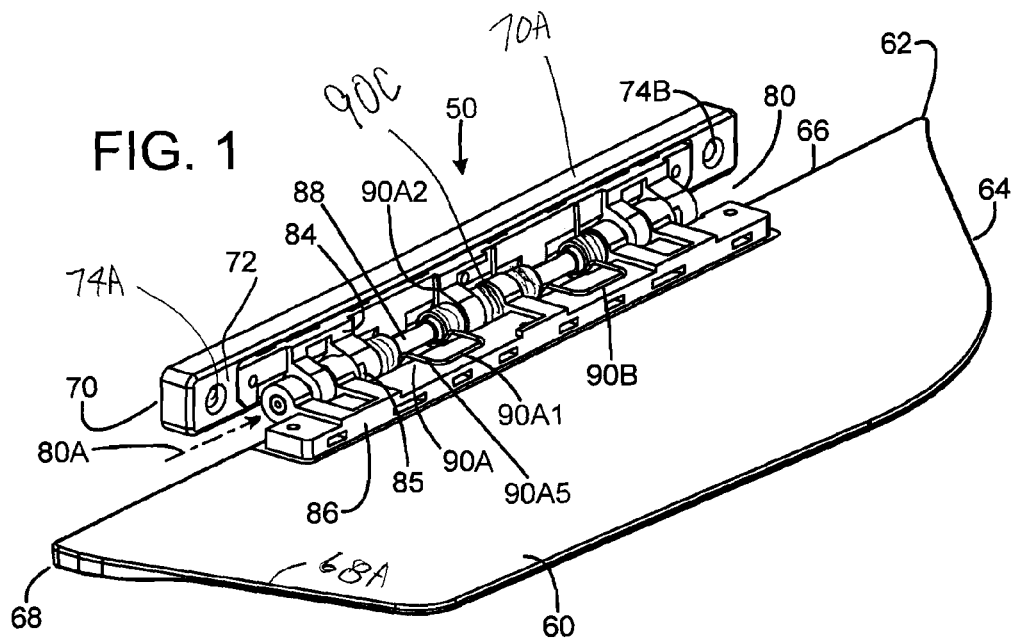
FIG. 1 is an isometric view of an exemplary retractable wind deflector system, shown in the stowed position, with a cover removed.
Figure 2:
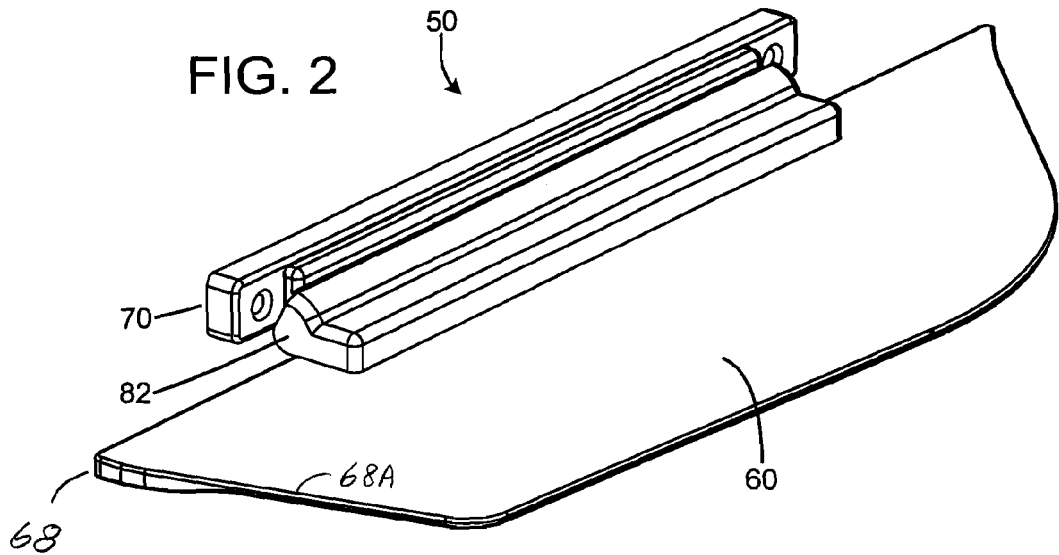
FIG. 2 is an isometric view of the retractable wind deflector system of FIG. 1, with the cover installed.
Figure 5:
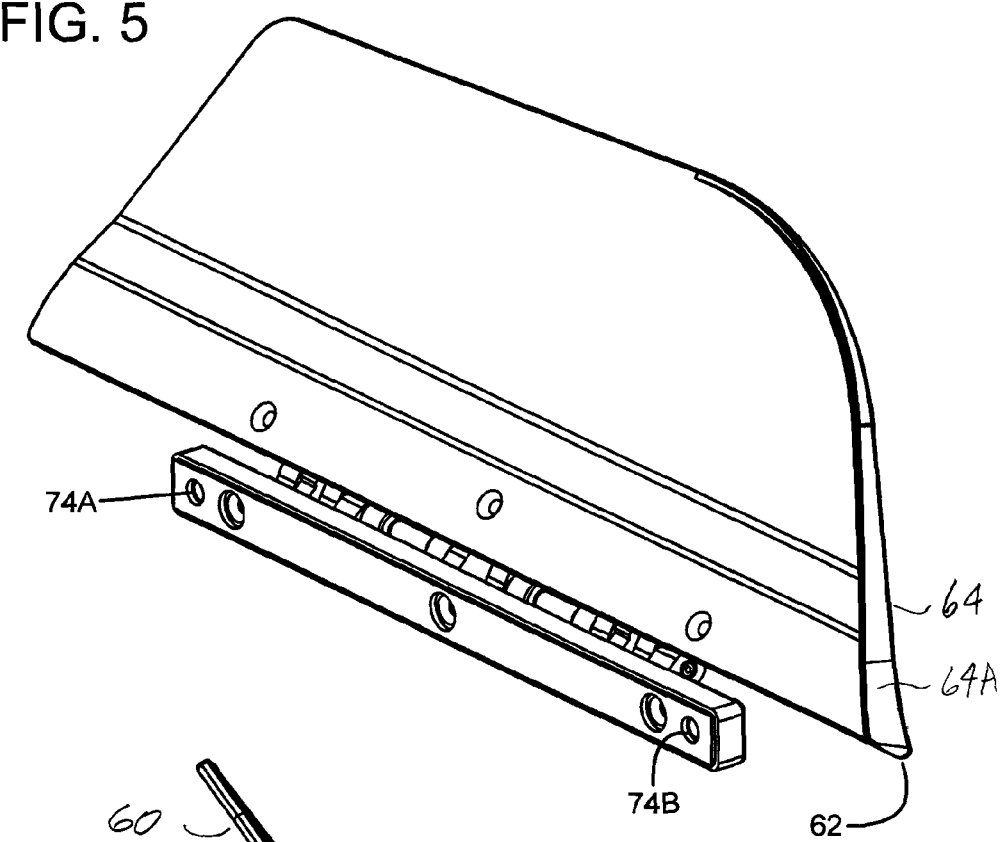
FIG. 5 is an isometric view similar to FIG. 4, but taken from a reverse angle.
Figure 6:
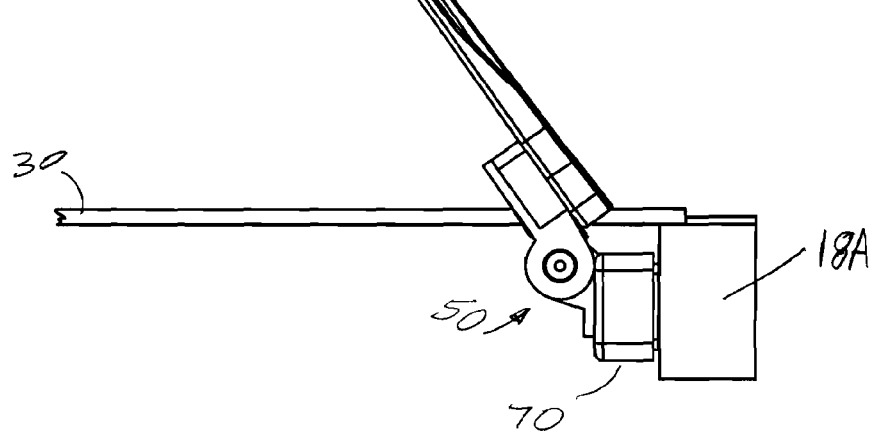
FIG. 6 is a top view of the wind deflector system in the deployed position.

In the following detailed description and in the several figures of the drawing, like elements are identified with like reference numerals. The figures may not be to scale, and relative feature sizes may be exaggerated for illustrative purposes.

A retractable wind deflector for a vehicle is configured to deploy a deflector body from a stowed position to a deployed position extending outside the vehicle compartment when a window is opened, and to return the deflector body from the deployed position to the stowed position when the window is closed.

An exemplary embodiment of a retractable wind deflector for a vehicle is configured to automatically deploy a deflector body from a stored position inside the vehicle interior compartment to a deployed position extending through a window opening when a window is opened, and to automatically move the deflector body from the deployed position to the stored position by contact with the window as the window is moved from the open to the closed position.

One embodiment of the retractable wind deflector attaches to a rear window frame or door pillar, e.g. of a four door sedan, so that when the window is rolled down, the deflector surface deploys outwardly deflecting wind away from the passenger compartment when the vehicle is at speed. In another embodiment, the retractable wind deflector may be attached to a B pillar between the front door and the rear door or rear window. As the window is rolled up, the top edge of the window contacts the deflector, pushing it to the stowed position. The deflector body may be made of a clear or translucent material, e.g. polycarbonate. Another embodiment of the wind deflector is operated by a motor, and the deflector surface may be stowed inside the door pillar, and extended to the deployed position by the motor, typically when the vehicle window is opened.

Figure 7:
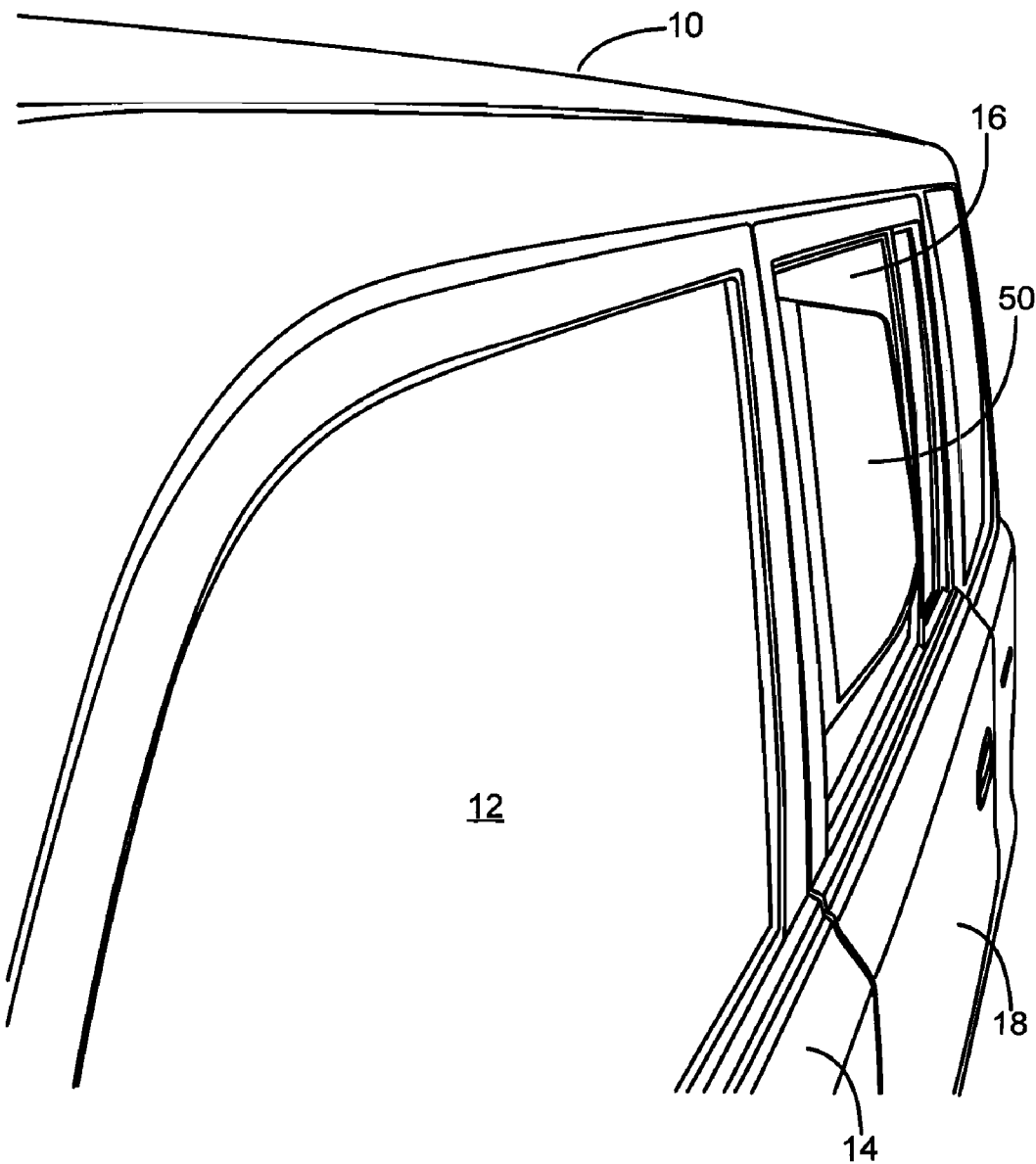
FIG. 7 is an isometric view of a portion of a vehicle showing a wind deflector in a deployed position.
Figure 8:
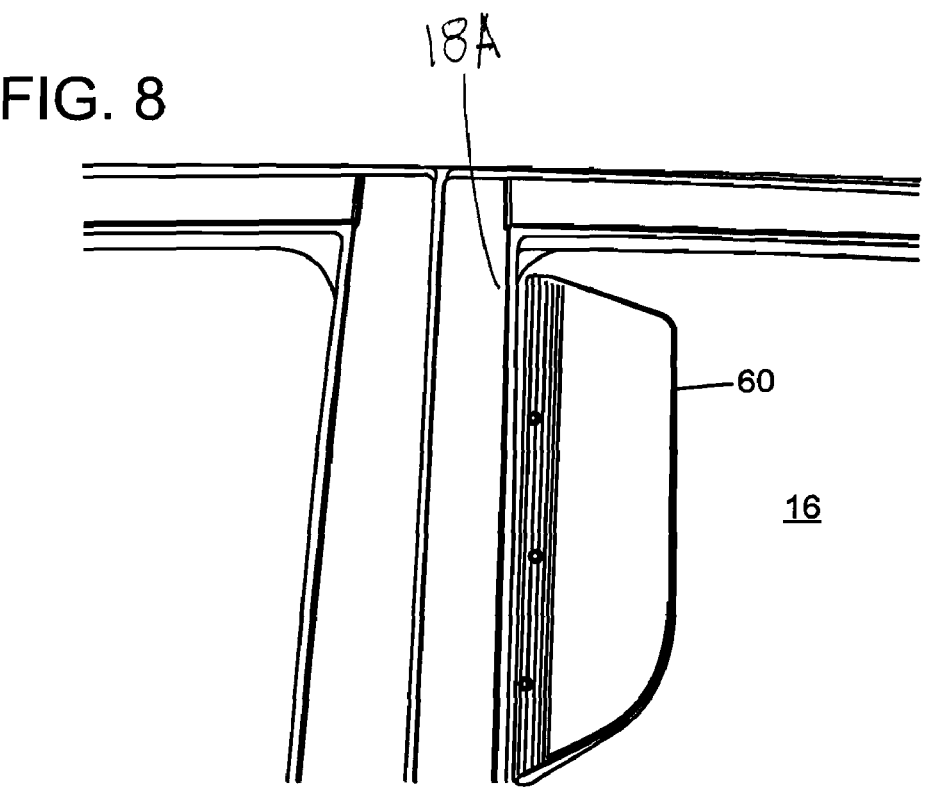
FIG. 8 is a side isometric view of a portion of a vehicle showing a wind deflector in a deployed position
Figure 9:
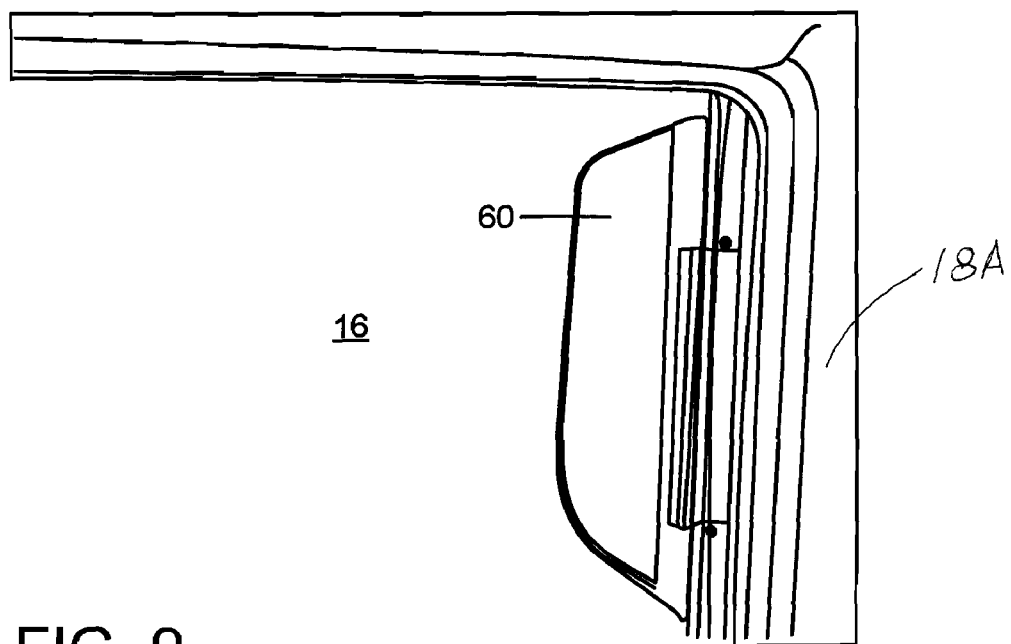
FIG. 9 is a reverse side view of the vehicle of FIG. 8, taken from the interior of the vehicle.

An exemplary embodiment of a retractable wind deflector 50 is illustrated in FIGS. 1-9. The deflector system includes a deflector body 60, a mounting bracket 70, and a connector structure 80 connecting the deflector body to the mounting bracket. FIGS. 7-9 show the system installed on a vehicle 10, including a front door 14 with a window 12, and a rear door 18 with a window 16. The deflector system in this embodiment is installed on the rear door/window frame, adjacent the opening for window 16. The deflector system 50 is depicted in FIGS. 7-9 in the deployed position, with the deflector body deployed through the window opening. Wind deflectors may be installed on the left side and the right side of the vehicle, with the right side deflector being a mirror image of the deflector on the left side.

The deflector body in this embodiment is a one-piece structure, fabricated of a material such as polycarbonate, having a longitudinal length dimension along edge 66 which is selected to be less than the height of the window opening to which the deflector will be installed. Tip 62 of the body is the lower-most portion of the body when installed in the vehicle, positioned near, but above the bottom of the window opening. Tip 68 of the body is the upper-most portion of the body when installed in the vehicle, positioned near, but below the top of the window opening. In one exemplary embodiment, the deflector body has a length dimension of 11 inches, and a width dimension of 3.5 inches at its has body has a length dimension of 11 inches, and a width dimension of 3.5 inches at its widest part. The deflector body is sized so that it can deploy from a stowed position inside the vehicle to a deployed position, rotated about the connector structure 80, with the body extending through the window opening.

In an exemplary embodiment, the deflector body includes an edge 64 extending from tip 62. The edge 64 preferably extends at an angle relative to the edge 66 which is less than a right angle, and preferably in a range of 45 to 75 degrees. In this exemplary embodiment, the deflector body 60 is essentially parallel to the closed window in its stowed position, and at its fully deployed position, the deflector body has moved out to an angle of about 75 degrees relative to its stowed position. In other embodiment, the deployed angle can be smaller or larger, e.g. 80 degrees or 90 degrees. The edge 64 may be non-linear as well, and defines a beveled or ramped surface contour 64A, shown for example in FIG. 5. The angular relation of the edge 64 to the edge 66 and its ramped surface contour facilitates the movement of the body from a deployed position to the stowed position in response to the closing of the window, and the top edge of the window bearing against the edge 64 and ramped surface contour 64A of the body, as discussed more fully below.

The mounting bracket 70 includes an elongated structure 72, configured for attachment to a door pillar or window frame 18A adjacent the window 30 (FIG. 3), or to the window frame structure (FIG. 3), e.g. by fasteners such as threaded fasteners or rivets passed through openings 74A, 74B, facilitated by double-sided adhesive tape 76 and peel-off tape cover 78. The mounting bracket includes a cover 70A (FIG. 1A).

The connector structure 80 in an exemplary embodiment includes a hinge structure comprising a frame wing or leaf portion 84 attached to the mounting bracket, a deflector wing or leaf portion 86 attached to the deflector body 60 (e.g., by threaded fasteners or rivets), and a pivot axle 88. The axle may be fabricated of metal. The wing portions may also be fabricated of metal, or of a plastic material of suitable strength. A cover 82 fits over the deflector wing against the base of the deflector body. Each wing includes sets of hinge knuckles or loops having openings or bores configured to receive the pivot axle 88. The sets of hinge knuckles for the respective hinge wings are interleaved. The sets of knuckles include interleaved knuckles 84A, 84B, 84C of hinge wing 84, and knuckles 86A, 86B, 86C (FIG. 4), for example. A compression spring 90C (FIG. 1A) may be employed and fitted onto the axle 88 between knuckles 84C and 86C.

The connector structure in this embodiment also includes biasing means for applying a rotational bias force to the deflector body, tending to rotate the deflector body to the deployed position. The biasing means also applies an axially directed force, tending to push the deflector body in a vertical, down direction, indicated by arrow 80A (FIG. 3). The biasing means in this exemplary embodiment includes spring members 90A and 90B, fabricated of a spring metal or wire material, for example, and the compression spring 90C. Each spring member 90A and 90B is configured to provide rotationally directed bias forces to the deflector body 60. Spring 90A, for example, includes a U-shaped portion 90A1 positioned against the deflector wing 84, with leg 90A2 of the U-shaped portion elongated and bent in an arc to encircle a part of the axle 86 or of a sleeve portion of the knuckle, e.g. sleeve 84B3 (FIG. 4), and extend in a straight portion against the frame wing portion 82. The opposite leg 90A3 of the U-shaped portion is also bent in arc to encircle a part of the axle 86 or a sleeve portion of a knuckle. The spring exerts a radial bias force by spring force between the leg 90A2 and the U-shaped portion 90A1. The spring members 90A and 90B may be implemented as torsion springs, for example.

The compression spring 90C provides the axially directed biasing force, tending to apply a bias force in the direction of arrow 80A (FIG. 1).

The connector structure 80 further includes a locking mechanism, which locks the deflector body in the deployed position, and which is released by axial movement of the deflector body in a direction opposite the axial bias force. In an exemplary embodiment, the locking mechanism includes protruding shoulder surfaces 84B1, 86B1 formed in the interleaved knuckles 84B, 86B. The gap 85 (FIG. 4) between adjacent knuckles and between surfaces 84B2 and 86B2 is selected to be large enough to allow axial movement of the deflector body, in a direction urged by the axial spring force exerted by the compression spring 90C. The depth of the shoulder surfaces may be relatively small, e.g. on the order of 0.25 inch or less. As the deflector body is rotated about the hinge axle from the stowed position to the deployed position, the deflector body drops down along the axle to a position in which surfaces 84B1 and 86B1 are facing each other, preventing rotation back to the stowed position. As the window is raised, e.g. by contact of edge or ramp surface 64 with the top edge of the window, the deflector body is initially moved (raised) axially releasing the surfaces 84B1 and 86B1 from contact with each other, and permitting radial movement of the deflector body back to the stowed position. The ramp surface 64A of the curved edge 64 is contacted by the top edge of the window, and transfers the upwardly directed pushing force of the window into a horizontal force component tending to rotate the deflector body back to the stowed position.

The locking of the hinge prevents the deflector body or blade from buffeting in the wind when in the deployed position. The spring loaded, self-deploying deflector system in this embodiment is dependent on the window going down, with a self retracting action when the window goes up.

Another embodiment of a deployable wind deflector is illustrated in FIGS. 10-11. In this embodiment, the deflector 100 is mounted for movement on tracks 110A, 110B, between a stowed position within the B pillar of the vehicle separating the front door 14 and the rear door 18, and passes through a slot in the pillar. A motor 120 is coupled to the deflector by a gear train or friction engagement, and is actuated by a control circuit 130 to move the deflector 100 from its stowed position, through the slot in the pillar to the deployed position shown in FIGS. 10 and 11. The control circuit 130 may be connected to the power window switch 140 for the rear door, so that the deflector is deployed when the rear window is lowered, and stowed when the rear window is closed. Alternatively, the switch 140 may be dedicated to the function of deploying the wind deflector. The slot in the pillar may have an elastomeric cover with a slit or overlapping flap to protect against entry of moisture and dirt.

Figures 12, 13:
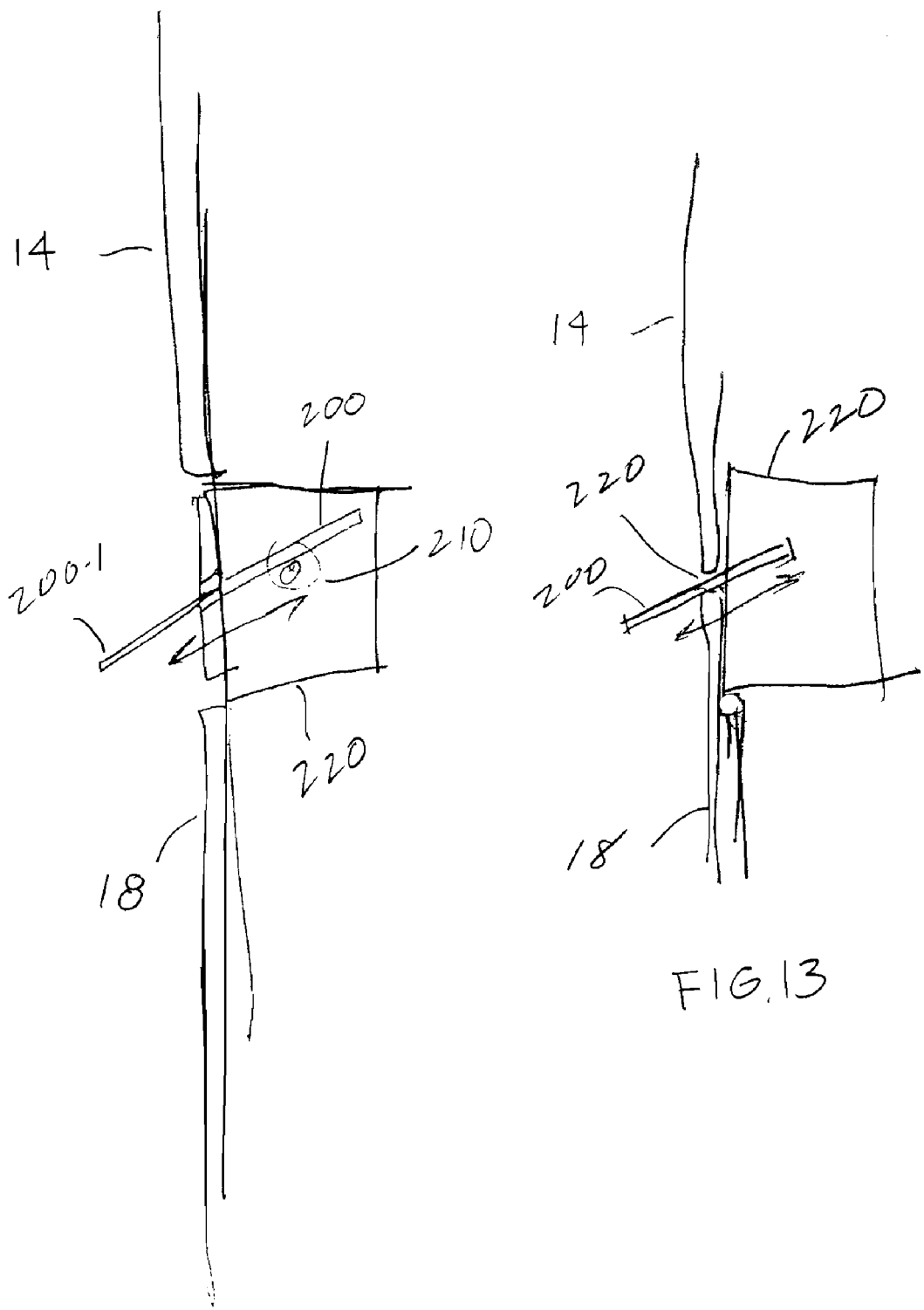
FIGS. 12 and 13 are diagrammatic views of another alternate embodiment of a wind deflector.

Another embodiment of the wind deflector is depicted in FIGS. 12 and 13. In this example, the vehicle front and rear doors 14 and 18 are separated by a relatively large gap and the B pillar 220. The deflector body 200 is mounted for movement between a stowed position inside the pillar 220, and the deployed position with a portion of the deflector body outside the vehicle, protruding through a slot in the pillar. A motor 210 is mechanically coupled to the deflector body, and moves the deflector body on tracks or rails between the stowed and deployed positions. The motor may be actuated in the same manner described above with respect to the embodiment of FIGS. 10-11. Reference number 200-1 points to the deflector body in a deployed position in FIGS. 12, and 210 to the deflector body in the stowed position. FIG. 13 depicts the deflector body in an intermediate position.

Although the foregoing has been a description and illustration of specific embodiments of the invention, various modifications and changes thereto can be made by persons skilled in the art without departing from the scope and spirit of the invention.

What is claimed is:

1. A wind deflector system for a vehicle, configured to automatically deploy a deflector body from a stowed position inside a vehicle interior compartment to a deployed position extending through a window opening of the vehicle when a window is opened, and wherein the deflector body is configured for deflection from the deployed position to the stowed position by contact with the window as the window is moved from the open to the closed position, the deflector body is rotatable about a rotation axis to move from the stowed position toward the deployed position, and further including a lock structure to lock the deflector body in the deployed position and prevent rotation of the deflector body about the rotation axis in a locked condition, and which is automatically unlocked by contact of the deflector body with the window as the window is moved from the open position toward the closed position, and wherein the deflector body has a lower curved edge with an incline ramp surface contour, and a top edge of the window contacts the ramp surface contour of the deflector body as the window is raised from the open position, and wherein the ramp surface contour facilitates movement of the deflector body from the deployed position to the stowed position.

2. The system of claim 1, wherein the deflector body is in contact with an interior surface of the window when in the stowed position.

3. The system of claim 1, wherein the lock structure is configured to release the deflector body from the locked condition in response to contact of the deflector body by the window as the window is lifted from the open position.

4. The system of claim 1, further comprising a biasing structure exerting a rotational force on the deflector body tending to rotate the deflector body about the rotation axis toward the deployed position.

5. The system of claim 4, wherein the biasing structure further exerts an axially directed force tending to move the deflector body in a downward direction along the rotation axis.

6. The system of claim 1, wherein the vehicle window is a rear door window.

7. The system of claim 1, further comprising a mounting bracket configured for attachment to a door pillar or window frame adjacent the window opening, and a hinge structure defining the rotation axis and pivotably connecting the deflector body to the mounting bracket, allowing said rotation and also axial movement of the deflector body through a limited range of movement, wherein the hinge structure is configured to allow axial movement of the deflector body in a first direction as the deflector body moves to the deployed position to position the deflector body in a locked position, and to allow axial movement of the deflector body in a second direction to position the deflector body in an unlocked position as the deflector body is contacted by the window as the window is moved from the open position toward the closed position.

8. A wind deflector system for a vehicle having a vehicle window movable in a first direction from an open position to a closed position, and in a second direction from the closed position to the open position, comprising:
a deflector body;
a mounting bracket configured for connection to a vehicle mounting surface adjacent the vehicle window;
a connector structure connecting the deflector body to the mounting bracket, the connector structure configured to automatically deploy the deflector body from a stowed position inside a vehicle interior compartment to a deployed position extending through a window opening of the vehicle when the window is opened, wherein the connector structure permits deflection of the deflector body from the deployed position to the stowed position resulting from contact of the deflector body with the window as the window is moved from the open to the closed position, and wherein the connector structure defines a rotation axis, and the deflector body is rotatable about the rotation axis to move from the stowed position toward the deployed position; and
a lock structure to lock the deflector body in the deployed position and prevent rotation of the deflector body from the deployed position to the stowed position when in a locked condition, and which is automatically unlocked by contact of the deflector body with the window as the window is moved from the open position toward the closed position; and
wherein the deflector body has a lower ramp edge contour, and a top edge of the window contacts the ramp edge contour of the deflector body as the window is moved from the open position to the closed position, and wherein the ramp surface contour facilitates movement of the deflector body from the deployed position to the stowed position.

9. The system of claim 8, wherein the deflector body is in contact with an interior surface of the window when in the stowed position.

10. The system of claim 8, wherein the lock structure is configured to release the deflector body from the locked condition in response to contact of the deflector body by the window as the window is lifted from the open position.

11. The system of claim 8, further comprising a biasing structure exerting a rotational force on the deflector body tending to rotate the deflector body about the rotation axis toward the deployed position.

12. The system of claim 11, wherein the biasing structure further exerts an axially directed force tending to move the deflector body in a downward direction along the rotation axis.

13. The system of claim 8, wherein the vehicle window is a rear door window in a motor vehicle.

14. The system of claim 8, wherein the connector structure is further configured to allow axial movement of the deflector body in a first direction as the deflector body moves to the deployed position to position the deflector body in a locked position, and to allow axial movement of the deflector body in a second direction to position the deflector body in an unlocked position as the deflector body is contacted by the window as the window is moved from the open position toward the closed position.

15. A wind deflector system for a vehicle having a vehicle window movable in a first direction from an open position to a closed position, and in a second direction from the closed position to the open position, comprising:
a deflector body;
a mounting bracket configured for connection to a vehicle mounting surface adjacent the vehicle window;
a connector structure connecting the deflector body to the mounting bracket, the connector structure configured to automatically deploy the deflector body from a stowed position inside a vehicle interior compartment to a deployed position extending through a window opening of the vehicle when the window is opened, wherein the connector structure permits deflection of the deflector body from the deployed position to the stowed position resulting from contact of the deflector body with the window as the window is moved from the open to the closed position, and wherein the connector structure defines a rotation axis, and the deflector body is rotatable about the rotation axis to move from the stowed position toward the deployed position; and
a lock structure to lock the deflector body in the deployed position and prevent rotation of the deflector body from the deployed position to the stowed position when in a locked condition; and
wherein the connector structure comprises a hinge including a frame wing portion, a deflector wing portion, and overlapping knuckles through which a hinge axle passes.

16. A wind deflector system for a vehicle, configured to deploy a deflector body from a stowed position inside a vehicle interior compartment to a deployed position extending outside the vehicle compartment adjacent a vehicle side window, the wind deflector system including an actuating mechanism for moving the deflector body between the stowed position and the deployed position, the deflector body rotatable about a rotation axis to move from the stowed position toward the deployed position, and further including a lock structure to lock the deflector body in the deployed position and prevent rotation of the deflector body about the rotation axis in a locked condition, and wherein the lock structure is automatically unlocked by contact of the deflector body with the window as the window is moved from an open position toward a closed position; and wherein the deflector body has a lower ramp edge contour, and a top edge of the window contacts the ramp edge contour of the deflector body as the window is moved from the open position to the closed position, and wherein the ramp surface contour facilitates movement of the deflector body from the deployed position to the stowed position.

17. The system of claim 16, wherein the actuating mechanism including is configured to automatically deploy the deflector body to the deployed position when the side window is opened.

18. The system of claim 17, wherein the actuating mechanism is configured to permit deflection of the deflector body from the deployed position to the stowed position by contact with the window as the window is moved from the open to the closed position.

19. The system of claim 16, wherein the actuating mechanism includes a motor for driving the deflector body between the stowed position and the deployed position.

20. The system of claim 16, wherein the deflector body is in contact with an interior surface of the window when in the stowed position.

21. The system of claim 16, wherein the lock structure is configured to release the deflector body from the locked condition in response to contact of the deflector body by the window as the window is lifted from the open position.

22. The system of claim 16, further comprising a biasing structure exerting a rotational force on the deflector body tending to rotate the deflector body about the rotation axis toward the deployed position, and the biasing structure further exerts an axially directed force tending to move the deflector body in a downward direction along the rotation axis.

23. The system of claim 16, wherein the side window is a rear door window.

24. The system of claim 16, further comprising a mounting bracket configured for attachment to a door pillar or window frame adjacent the window opening, and a hinge structure defining the rotation axis and pivotably connecting the deflector body to the mounting bracket, allowing said rotation and also axial movement of the deflector body through a limited range of movement, wherein the hinge structure is configured to allow axial movement of the deflector body in a first direction as the deflector body moves to the deployed position to position the deflector body in a locked position for said lock structure, and to allow axial movement of the deflector body in a second direction to position the deflector body in an unlocked position for said lock structure as the deflector body is contacted by the window as the window is moved from the open position toward the closed position.

* * * * *